United States Patent Office 3,314,750
Patented Apr. 18, 1967

3,314,750
TRIMETAPHOSPHATE PROCESSES
Chung Yu Shen, St. Louis, Mo., assignor to Monsanto Company, a corporation of Delaware
No Drawing. Filed Apr. 20, 1962, Ser. No. 188,938
12 Claims. (Cl. 23—106)

This invention relates to novel processes for manufacturing sodium trimetaphosphate. More particularly, the present invention relates to novel, relatively low temperature "melt" processes for manufacturing sodium trimetaphosphate.

It is an object of the present invention to provide novel "melt" processes for manufacturing sodium trimetaphosphate, in which processes relatively inexpensive inorganic sodium salts (other than sodium phosphates) can be used as raw materials.

This object, as well as others which will become apparent from the following discussion, can be accomplished by heating certain blends that contain an inorganic ammonium phosphate salt and a sodium salt of an acid, which acid is ordinarily volatile at temperatures below about 600° C.

The processes of this invention involve a heating step, whereby the temperature of one of the appropriate blends of solid salts is raised to a point at which the entire blend ordinarily becomes molten (at which point the temperature of the blend is surprisingly significantly lower than the melting point of any of the known sodium polyphosphate salts). Additional heat can then be applied to the resulting "melt" so that certain decomposition products are evolved from the "melt." Then, the temperature of the "melt" can be raised still further, until the blend solidifies. The solidified material, which generally results merely from heating the "melt" until it subsequently solidifies, can often be utilized in the form in which it solidifies as a desirable sodium trimetaphosphate product of commerce, (except for particle size adjustment which is sometimes necessary).

The inorganic ammonium orthophosphate salts that can be utilized as raw materials in the practice of the present invention are those that are soluble in water to the extent of at least about 5 weight percent at about 25° C. and include the ammonium orthophosphate salts (monoammonium, diammonium, and triammonium orthophosphate). Mixed sodium-ammonium salts of the aforementioned orthophosphate anion, such as, for example, monosodium monoammonium orthophosphate. Of all these ammonium orthophosphate salts, the use of monoammonium and/or diammonium orthophosphate is preferred.

The term "volatile acid" is intended to encompass inorganic monobasic and dibasic acids which in and of themselves have vapor pressures higher than about 760 mm. of mercury at some temperatures below the melting point of sodium trimetaphosphate (i.e., about 600° C.). The term "volatile acid" is also intended to include those acids, the sodium salts of which decompose at temperatures below about 600° C. in a concentrated phosphoric acid medium to yield decomposition products that are substantially entirely volatile at a pressure of one atmosphere and a temperature below about 600° C. Stated otherwise, the term "volatile acids" encompasses those acids which can be removed by distillation (either as decomposition products or in the undegraded acid form) from concentrated phosphoric acid, after the sodium salt of the "volatile acid" has been dissolved thereinto. Thus, the term "volatile acid" encompasses acids having anions such as halogen (including fluoride, chloride, bromide, and iodide), nitrate, nitrite, carbonate, oxalate, formate, and the sodium salts of such acids as these can readily be utilized in the processes of the present invention. The "sodium salts of volatile acids" which are preferred for use in the processes of this invention are the sodium salts of the above-described acids which have vapor pressures equal to at least about 760 mm. of mercury at some temperature below about 400° C. or which decompose spontaneously when they are heated at about 400° C. to yield largely decomposition products that are volatile at about 400° C. and under about one atmosphere of pressure.

These preferred sodium salts of volatile acids include the sodium salts of, among others, the halogen acids, nitric acid, and carbonic acid. From an economic point of view, the sodium salts of hydrochloric, nitric, and carbonic acids are particularly preferred "raw" materials for use in the practice of the present invention.

It is an advantage of the present invention that it can be utilized to manufacture relatively pure sodium trimetaphosphate products that are essentially free of water-insolube metaphosphates (commonly referred to as "IMP"). Thus, in order to manufacture practically pure sodium trimetaphosphate, one needs simply to heat a blend (consisting essentially of an ammonium orthophosphate salt with one of the aforementioned sodium-volatile acid salts) having an overall ionic ratio of Na to P of about 1.0 according to one of the procedures which will be detailed below. When it is desired to manufacture a mixture that contains sodium tripolyphosphate and at least about 50 weight percent of sodium trimetaphosphate, an initial blend having an over-all Na/P ratio of from about 1.0 to about 1.15 should be utilized in the processes of this invention.

Essentially, the processes of this invention require only that an intimate mixture of the ammonium orthophosphate salt with one of the sodium volatile acid salts described above be exposed to temperatures that cause the evolution of gaseous decomposition products from the mixture. Ordinarily, gaseous decomposition products are not evolved from the mixture until at least part of the mixture has apparently "melted," or become fluid, which transformation from a solid or crystalline appearance to a molten state occurs practically invariably at a temperature above about 110° C. Just what the decomposition products are (from any particular mixture of appropriate salts) depends largely upon the particular sodium salt that is utilized. For example, when sodium chloride is used, at least part of the gas that is evolved from the molten blend is believed to be ammonia, hydrochloric acid, and ammonium chloride. When sodium nitrate is used, gaseous nitrous and nitric oxides are believed to be evolved. When sodium carbonate is used, part of the evolved gas is carbon dioxide. However, the successful practice of the present invention is independent of the particular identity of the gaseous decomposition products. If some gases are evolved from an appropriate mixture when it is heated and in a "molten" state, then a corresponding amount of water soluble chain sodium polyphosphate material is present in the reaction mixture. When the mixture is heated so that no further evolution of gaseous decomposition products can be observed, the conversion of the phosphate salts into the desired water soluble chain sodium polyphosphate product is essentially complete. It is this latter procedure (i.e., heating the reaction mixture until no more gases are evolved therefrom) which is a particularly preferred embodiment of the present invention.

The actual temperatures to which the molten mixture must be heated in order for a substantial proportion of the gaseous decomposition products (from the interaction and decomposition of the ammonium orthophosphate salt and the sodium salt of the volatile acid) to be evolved from the reaction mixture will vary considerably, depending upon such factors as the particular sodium volatile acid salt or salts utilized, the air or gas pressure over the reaction mixture (whether a vacuum has been applied thereto, for example), and the partial pressure of the various gases in the atmosphere over the reaction mixture. As a general rule, however, the temperature of the mixture should be raised to a point considerably (for example, at least about 50° C.) above that at which the mixture or blend of salts initially "melt," whether a vacuum is applied to the atmosphere over the reaction mixture or not. In addition, there is no definite upper reaction temperature, above which the invention cannot operate. However, as a practical matter, the temperature of the reaction mixture should be kept below the melting point of any of the water soluble chain sodium polyphosphate salts in the final reaction mixture. This is particularly true when one intends to manufacture a preferred product that contains very few impurities (i.e., salts other than the desired water-soluble sodium polyphosphate salts).

In order to prepare such a preferred product it is necessary that one maintain the reaction mixture at a suitable reaction temperature (generally above about 300° C., and preferably above about 400° C.) until substantially no more gaseous decomposition products are evolved from the blend upon prolonged heating, or heating at a still higher temperature. Generally this requires that the reaction mixture be maintained in the appropriate range for at least about 5 minutes, and preferably for at least about 10 minutes. A preferred process for attaining such a preferred product requires that temperatures of the molten mixture be increased over a period of at least about 10 minutes, through a temperature range of at least about 150° C., after the first gaseous decomposition products are evolved from the molten reaction mixture. Ordinarily the temperature at which the first gaseous decomposition products will be evolved from the reaction mixture will be at least about 110° C. Under a vacuum, this initial decomposition temperature can be still lower. Generally a significant proportion of the gaseous decomposition products are evolved from the "melt" by the time its temperature reaches 200° C. A very convenient method for determining when the desired preferred product has been attained in the heated reaction mixture is readily available to those who practice the invention. All that is necessary to utilize this convenient method is for one to continue to heat the reaction mixture (at a temperture below the melting point of any of the water-soluble chain sodium polyphosphates that are present in a significant amount in the desired final product, but above about 300° C.) in the molten state until the entire reaction product becomes solid. If agitation is applied to the blend during this heating-decomposition step, the reaction product solidifies as a particulated solid. Thus, when a sodium salt is utilized, the temperature of the reaction mixture should be maintained between about 350° C. and about 625° C. in order for substantially all of the phosphate salts in the reaction mixture to be converted to sodium trimetaphosphate, or a mixture of sodium trimetaphosphate and water soluble chain sodium poly-phosphate salts. It has been found, for example, that starting with an initial mixture of monoammonium orthophosphate and sodium chloride (as in Example I, below), the mixture solidifies at a temperature as low as about 400° C.

The ammonium orthophosphate salts described above can be blended with the sodium salt of the volatile acid in practically any manipulative manner whatever without detracting significantly from the beneficial results that can be obtained by practicing the present invention. For example, solid crystals of each can be blended in the proper relative proportions prior to the heating-decomposition step. Also, aqueous solutions of each can be prepared, intermixed, and dried to remove water therefrom prior to the heating-decomposition step; or the water from an aqueous mixture can be removed as an initial stage of the heating-decomposition step. Since the necessary decomposition of the "raw" materials almost invariably takes place in the so-called "melt" stage of the processes of this invention, each of the individual materials (the ammonium orthophosphate salt and the sodium salt of a volatile acid) can be melted separately, and then intermixed in the molten state. However, this procedure is ordinarily not as desirable as one that involves the melting of an initial mixture of the two essential salts because some of the salts decompose prematurely when they are heated alone. The particle sizes of the essential salts (when they are intermixed) are not at all critical for the successful practice of the invention. Nor is the initial degree of intermixture of the essential salts believed critical. All that is necessary is that when the molten stage of the process is attained, both salts are present in the "melt" in the desired ratios.

While depending upon the particular water-soluble chain polyphosphate salts that are desired in the final products that result from the practice of this invention, the ratio of M/P in the initial "raw" reaction mixtures must be accurately controlled, the same is not true with respect to the total amount of ammonium cations in the initial mixtures. All that is ordinarily necessary is that there be, in the initial mixture, at least as much ammonium cation as there is sodium cation; that is, the ratio of $NH_4/M$ in the initial mixture (preferably prior to the initial evolution of gaseous decomposition products from the molten reaction mass) should generally be at least about 1.0, but can be as high as 2.0, or even 3.0 or higher in some instances, except when a sodium carbonate, bicarbonate, formate, or oxalate is used as the sodium-volatile acid salt. In such instances, $NH_4/M$ ratios in the initial mixture as low as about 0.7 or even lower can be utilized. As a matter of fact, the presence of substantially heat-volatilizable ammonium salts other than the ammonium orthophosphates in the initial reaction mixtures of the present invention are not normally detrimental at all to the processes of the present invention. In addition, other materials can also be present in the initial reaction mixture without detracting significantly from the benefits that can accrue to those who practice this invention, so long as the basic requirements described above (with respect to Na/P and $NH_4/Na$ ratios) are met. However, since for most of the potential uses of the sodium polyphosphate products that can be made by the processes of this invention it is desired that the products be practically completely water-soluble, it is desirable and generally preferred that the initial reaction mixture be substantially free of alkaline earth metal cations. Mixed ammonium-sodium salts of the phosphates described heretofore can also be utilized as "raw" materials in the practice of the present invention. However, it is preferred that at least about half of the sodium cation in the reaction mixture be added thereto in the form of a volatile acid salt.

Practically any readily available mixing equipment, such as ribbon-type mixer, can be used to initially blend the ammonium orthophates salt or salts with the sodium salt or salts of the volatile acid or acids. If these salts are blended in the dissolved state (in water, for example), a conventional mixing vessel is adequate. Since the "melt" stage of the present reaction mixtures is generally less corrosive than are the molten stages of most of the conventional "melt" processes for manufacturing sodium polyphosphates (because, for example, the processes of the present invention can be conducted at significantly lower temperatures, generally, and utilize ammonium phosphate salts, rather than pure phosphoric acid), a manufacturer of any of the sodium polyphosphate products within the scope of the present invention need not use equipment made from any particularly exotic metal alloys. Generally, one can use, for example, the commonly used varieties of stainless steel such as type 316 in the vessel in which he conducts the heating-decomposition step of the present invention.

In the following examples, which are illustrative of some of the preferred processes of this invention, all parts are by weight unless otherwise specified.

EXAMPLE I

Manufacture of sodium trimetaphosphate

A mixture of 450 parts of commercial flake monoammonium orthophosphate and 229 parts of commercial crystalline sodium chloride is prepared by blending them in a conventional ribbon-type mixer for about 5 minutes. The ratios of Na/P and $NH_4$/P in the resulting mixture are both essentially 1.0. The resulting mixture is then placed into a rotating stainless steel drum designed so that it can be heated externally. Heat is applied uniformly to the outside of the stainless steel drum by means of a natural gas flame. The mixture melts at approximately 120° C. The temperature of the "melt" is raised at a rate of about 2° C./minute to a temperature of about 150° C., at which temperature bubbles are observed escaping from the "melt." Additional heat is applied to the melt, so that the temperature is raised to about 350° C. in another 120 minutes. Then, at a temperature of about 40° C. the reaction mixture becomes solidified. A further increase in temperature to about 500° C. has apparently no effect on the solid reaction mixture. The product is then cooled. It contains more than 93% of sodium trimetaphosphate, a few percent of other sodium phosphates, and is practically completely soluble in room temperature water (at the 5 weight percent level). Thus, the product contains practically no IMP.

When a blend similar to that described in Example I is heated to above about 300° C. in about 35 minutes (from room temperature) and then cooled rapidly ("quenched") after the greater part of the decomposition reaction is completed, but while the blend is still in the "melt" or molten state (generally the temperature of the molden blend is between about 250° C. and about 550° C. at this time), a largely amorphous product results. Although this amorphous product can contain some ammonium and sodium orthophosphates (depending upon the particular "raw" materials used in the initial blend, and the actual extent to which the decomposition reaction was permitted to progress before the blend was quenched), it can also have practically all of the qualities of one of the class of phosphates which is widely recognized as the sodium phosphate "glasses," such as those described by J. R. Van Wazer, in "Phosphorus and Its Compounds," vol. I, pp. 777–779, Interscience Publishers (1958). The amorphous products that result from such a quenching (quick cooling) treatment are also generally practically free of IMP.

EXAMPLE II

Mixtures of sodium trimetaphosphate with sodium tripolyphosphate

At a rate of 3250 parts per hour of commercial crystalline diammonium orthophosphate and 1500 parts per hour of powdered commercial sodium carbonate, which are continuously fed into a conventional ribbon-type mixer (with a residence time in the mixer of about 8 minutes), a blend of diammonium orthophosphate and sodium carbonate having an over-all ratio of Na/P of about 1.15 is prepared. The ratio of $NH_4$/Na in the blend is about 1.7. The resulting blend or mixture is then heated in a rotating stainless steel calciner, externally heated to a temperature of about 525° C. The resulting solid reaction product is then cooled to room temperature. It contains about 26 weight percent of sodium tripolyphosphate, about 74 weight percent of sodium trimetaphosphate, and practically no IMP.

What is claimed is:

1. A process for manufacturing a sodium product consisting essentially of from about 50% to about 100% by weight of sodium trimetaphosphate and from 0% to about 50% by weight of water soluble chain sodium polyphosphates and essentially free of insoluble metaphosphates, which process comprises heating a mixture comprising a sodium salt of a volatile acid having anions selected from the group consisting of halogen, nitrate, nitrite carbonate, oxalate, and formate and a water-soluble material selected from the group consisting of ammonium orthophosphate salts and mixed sodium ammonium orthophosphate salts to a molten state and at a temperature above about 300° C. and below about 625° C. and continuing said heating until the reaction mass becomes solid, said mixture having an over-all Na/P ratio between about 0.75 and about 1.15.

2. A process as in claim 1 wherein said ammonium phosphate salt is an ammonium orthophosphate salt.

3. A process as in claim 2 wherein said ammonium orthophosphate salt is monoammonium orthophosphate.

4. A process as in claim 2 wherein said ammonium orthophosphate salt is diammonium orthophosphate.

5. A process as in claim 1 wherein said sodium salt of a volatile acid is selected from the group consisting of sodium halides, sodium nitrates, sodium carbonates, and mixtures thereof.

6. A process as in claim 5 wherein said sodium salt of a volatile acid is a sodium halide.

7. A process as in claim 6 wherein said sodium halide is sodium chloride.

8. A process as in claim 5 wherein said sodium salt of a volatile acid is a sodium nitrate.

9. A process as in claim 5 wherein said sodium salt of a volatile acid is a sodium carbonate.

10. A process for manufacturing a sodium phosphate product consisting essentially of from about 50 to about 100 weight percent of sodium trimetaphosphate and from 0 to about 50 weight percent of water soluble chain sodium polyphosphates and essentially free of insoluble metaphosphate, which process comprises (a) forming a blend by intermixing sodium chloride with an ammonium orthophosphate salt, the ratio of $NH_4$ ions to Na ions in said blend being at least about 1:1, and the over-all Na/P ratio in said blend being between about 1 and about 1.15, (b) reacting said sodium chloride with said ammonium orthophosphate salt by heating said blend to a molten state and at a temperature above about 300° C. and below about 625° and continuing said heating until the reaction mass becomes solid.

11. A process as in claim 10 wherein said sodium chloride and said ammonium orthophosphate are initially present in said blend in about equimolar proportions, and said heating is applied to said blend until said reaction product solidifies.

12. A process for manufacturing sodium trimetaphosphate and essentially free of insoluble metaphosphates, which process comprises heating a mixture of a sodium salt of a volatile acid selected from the group consisting of halogen acids, nitric acid, carbonic acid, and mixtures thereof and a water-soluble material selected from the group consisting of ammonium orthophosphate salts and mixed sodium ammonium orthophosphate salts to a molten state and at a temperature above about 300° C. and below about 625° C. and continuing said heating until the reaction mass becomes solid, said mixture having an over-all Na/P ratio of about 1.0.

References Cited by the Examiner

UNITED STATES PATENTS 2,867,504  1/1959  Semmens _____ 23—106

FOREIGN PATENTS 683,027  2/1930  France.
973,131  9/1950  France.
783,111  9/1957  Great Britain.

OTHER REFERENCES

Chemical abstracts, vol. 18, p. 2113 [1]; vol. 19, p. 447 [6]; vol. 48, col. 5608i.

Comptes Rendus, vol. 178, pp. 211–212, January–June 1921. Gmelin-Kraut: Handbuch der Anorgy. Chem., vol. 21, p. 403.

Mellor: Comprehensive Treatise on Inorg. and Theoretical Chem., vol. 2, p. 869.

Sneed et al.: Comprehensive Inorg. Chem., vol. 6, p. 149.

Van Wazer: Phosphorus and Its Compounds, vol. 1, pp. 667, 668, 683, and 685, Interscience, New York, 1958.

OSCAR R. VERTIZ, *Primary Examiner.*

MAURICE A. BRINDISI, O. F. CRUTCHFIELD,
*Assistant Examiners.*